(No Model.)
R. W. PRYOR & C. SCHAETZLE.
SPRING BELT PUNCH.
No. 574,164. Patented Dec. 29, 1896.
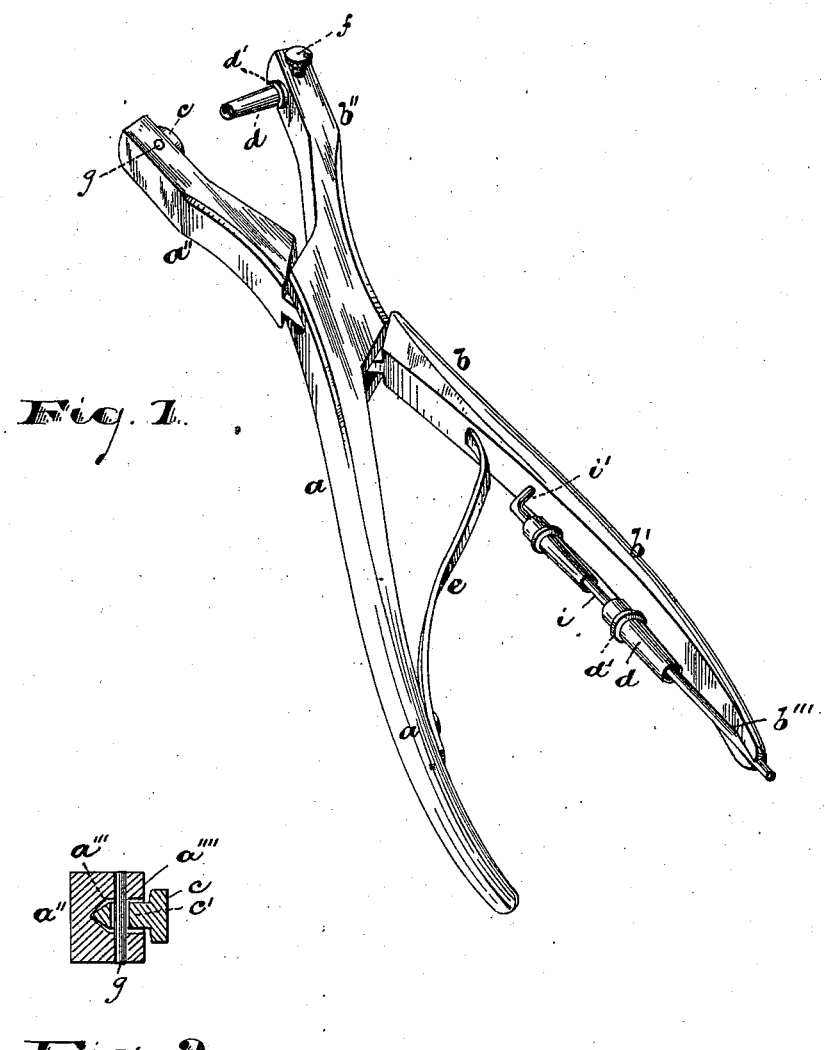
WITNESSES:
Robert Lolleberger
C. P. Sitney
INVENTORS:
Robert W. Pryor,
Charles Schaetzle,
BY Drake & Co. ATTY'S.

UNITED STATES PATENT OFFICE.

ROBERT W. PRYOR AND CHARLES SCHAETZLE, OF NEWARK, NEW JERSEY, ASSIGNORS TO THE W. W. PRYOR HARDWARE MANUFACTURING COMPANY, OF NEW JERSEY.

SPRING BELT-PUNCH.

SPECIFICATION forming part of Letters Patent No. 574,164, dated December 29, 1896.

Application filed February 27, 1896. Serial No. 581,021. (No model.)

*To all whom it may concern:*

Be it known that we, ROBERT W. PRYOR and CHARLES SCHAETZLE, citizens of the United States, residing at Newark, in the county of Essex and State of New Jersey, have invented certain new and useful Improvements in Spring Belt-Punches; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to secure more perfectly-cut perforations in belts, &c., to enable the cutting parts to automatically accommodate themselves to one another, so as to produce the desired perfection of cut; to facilitate the work of changing the cutters when it is desired to produce larger or smaller perforations; to reduce the cost of construction and provide a device of increased convenience as compared to certain other devices now in common use, and to secure other advantages and results, some of which may be referred to hereinafter in connection with the description of the working parts.

The invention consists in the improved belt-punch having the arrangements and combinations of parts, all substantially as will be hereinafter set forth and finally embraced in the clauses of the claim.

Referring to the accompanying drawings, in which like letters indicate corresponding parts in each of the two views, Figure 1 is a perspective view of the improved belt-punch, showing the relations of the several parts to each other; and Fig. 2 is a sectional view showing the construction of one of the cutting parts.

In said drawings, $a$ $b$ are the pivoted members of the punch, having the usual hand portions $a'$ $b'$ and ends $a''$ $b''$, having bearings for the cutters $c$ $d$, said pivoted members crossing one another at the pivot, so that when the hand portions $a'$ $b'$ are grasped by the hand and forced toward one another the cutting ends will be forced to bring the said cutters into engagement, all as is usual in ordinary spring-punches. A spring $e$ normally holds said cutters apart, opening the ends or jaws $a''$ $b''$ after they have been closed together when making the perforations.

The cutter $d$ is a removable piece of tubular shape with a projecting sharpened extremity, while the cutter $c$ is a flat plate or head against which the sharpened tube presses to secure the desired cut in the leather belt or other part.

The removable tubular cutter is near its base provided with an annular rim $d'$, serving as a gaging-stop, limiting the inward movement of the said cutter into the socket or perforation in the end $b''$ formed to receive it. A set-screw $f$ serves to hold the tubular cutter in place and admits of an easy and quick removal.

The coöperating cutter or head $c$ is automatically adjustable in its bearings on the end $a''$, and thus accommodates itself to the cutting edge of the tubular cutter $d$ to secure a uniform bearing of parts around the whole periphery of the cutting extremity and produce a clear uniform cut free from ragged edges. To receive said cutter or head $c$ the end $a''$ is recessed or cored out, as at $a'''$, the inner end of the recess being made funnel-shaped. Said end $a''$ is also transversely bored to receive a holding-pin $g$. Said cutter or head $c$ is provided with a shank $c'$, somewhat smaller diametrically than the recess, but of a length a little longer than the depth of said recess, the head $c$ being thus held away from the inner face $a''''$ of the end $a''$. Said shank $c'$ is also bored transversely or cored out, the perforation being diametrically larger than the holding-pin. Furthermore, the shank is made conical at its inner extremity, the angle of the opposite inclined sides being more acute than that formed by the opposite tapering or funnel-shaped sides of the recess. The shank is placed in said recess $a'''$ so that its small extremity rests in the angle of the funnel-shaped walls, and as the parts are loosely fitted said head has a limited rocking motion in any direction, whereby the desired engagement of parts is secured. After insertion the head $c$ is loosely held in place by the transverse pin $g$.

To store the tubular cutters $d$, we have pivoted a rod $i$ upon the inner side of one of the handles $b'$, upon which the tubular cutters not in use can be strung and held close to said inner surface or side of the handle. The said storage-rod $i$ is bent at its end lying toward the pivot of the members $a\ b$, and the short end $i'$ has a pivotal relation to the handle, by which the body of said rod may be thrown laterally to one side of the said handle to admit of the cutters being strung thereon.

The extremity of the handle $b'$ is notched or recessed at its inwardly-curved end, as at $b'''$, to receive the free end of the storage-rod, the resiliency of the rod allowing said free end to be forced into and held in the notch with sufficient security.

The rod $i$ may project a little beyond the end of the handle to provide means for conveniently opening the device to receive or allow the removal of the cutters.

Having thus described the invention, what we claim as new is—

1. The improved punch herein described, in which is combined with pivoted cutter members $a$, $b$, one of which is provided with a tubular cutter and the other with a recess and transverse perforations, the recess being funnel-shaped at its bottom or inner extremity, and a coöperating cutter-head $c$, having a shank with a conical extremity and a transverse perforation, and a pin held in the perforations of the member $a$, and passing through the shank of the head, the latter having a loose movement in said member $a$, and on said head, substantially as set forth.

2. The improved punch herein described, comprising the pivotal members $a$, $b$, one of which is provided with a cutter and the other a recess and transverse perforation, and a cutter-head $c$, loosely held in said recess, having a shank bearing firmly on the bottom of said recess, but having a rocking movement thereon in all directions, and a pin arranged in said transverse perforation and loosely holding said shank permanently within the recess, substantially as set forth.

In testimony that we claim the foregoing we have hereunto set our hands this 13th day of February, 1896.

ROBERT W. PRYOR.
CHARLES SCHAETZLE.

Witnesses:
OLIVER DRAKE,
CHARLES H. PELL.